US008414130B2

United States Patent
Pelah

(10) Patent No.: US 8,414,130 B2
(45) Date of Patent: Apr. 9, 2013

(54) DISPLAY SYSTEM FOR VIRTUAL REALITY

(75) Inventor: Adar Pelah, Cambridge (GB)

(73) Assignee: University of York, York (GB)

( * ) Notice: Subject to any disclaimer, the term of this patent is extended or adjusted under 35 U.S.C. 154(b) by 0 days.

(21) Appl. No.: 12/376,300

(22) PCT Filed: Aug. 6, 2007

(86) PCT No.: PCT/GB2007/002979
§ 371 (c)(1),
(2), (4) Date: Jun. 9, 2010

(87) PCT Pub. No.: WO2008/015463
PCT Pub. Date: Feb. 7, 2008

(65) Prior Publication Data
US 2010/0265171 A1 Oct. 21, 2010

(30) Foreign Application Priority Data
Aug. 4, 2006 (GB) .................................. 0615433.0

(51) Int. Cl.
*G03B 21/14* (2006.01)
(52) U.S. Cl.
USPC .......... 353/79; 353/7; 353/8; 353/28; 353/69; 353/122; 359/443
(58) Field of Classification Search ............. 353/69, 353/79, 28, 46, 7, 8, 121, 122; 715/850, 715/782, 783, 789, 811, 778, 708, 851, 852, 715/854, 855, 790, 803; 348/14.07, 14.08; 359/443–461
See application file for complete search history.

(56) References Cited

U.S. PATENT DOCUMENTS

| | | | |
|---|---|---|---|
| 6,334,687 B1 * | 1/2002 | Chino et al. | 353/79 |
| 6,902,513 B1 * | 6/2005 | McClure | 482/8 |
| 7,241,017 B2 * | 7/2007 | Ariyoshi | 353/79 |
| 7,605,837 B2 * | 10/2009 | Yuen et al. | 348/14.16 |
| 8,217,995 B2 * | 7/2012 | Dobbins et al. | 348/53 |
| 2002/0044349 A1 * | 4/2002 | Shinoura | 359/443 |

(Continued)

FOREIGN PATENT DOCUMENTS

| | | |
|---|---|---|
| EP | 0487385 A1 | 5/1992 |
| EP | 1306112 A1 | 5/2003 |
| JP | 07080096 | 3/1995 |

OTHER PUBLICATIONS

Baron, High-performance Projection Table, Technical Specifications, XP-002482748, May 28, 2004, 4 pages.

(Continued)

*Primary Examiner* — Georgia Y Epps
*Assistant Examiner* — Sultan Chowdhury
(74) *Attorney, Agent, or Firm* — Howard & Howard Attorneys PLLC

(57) ABSTRACT

A method of displaying an image on a screen having upper and lower extremities to a viewer located in front of the screen and at a horizontal distance from the screen, the method comprising the steps of: (a) inclining the screen at an angle of 60° or less to a horizontal plane behind the screen; (b) arranging the viewer and screen such that the upper extremity of the screen is further away than its lower extremity from the point of view of the viewer with said upper extremity above the head height of the viewer; and, (c) displaying the image on the screen.

20 Claims, 2 Drawing Sheets

U.S. PATENT DOCUMENTS

| | | | |
|---|---|---|---|
| 2003/0212536 A1* | 11/2003 | Wang et al. | 703/6 |
| 2004/0063549 A1 | 4/2004 | Kuo | |
| 2005/0022139 A1* | 1/2005 | Gettman et al. | 715/850 |
| 2009/0207383 A1* | 8/2009 | Hirahara et al. | 353/69 |
| 2009/0237620 A1* | 9/2009 | Yamamoto et al. | 353/69 |
| 2010/0020254 A1* | 1/2010 | Geng | 349/15 |

OTHER PUBLICATIONS

Dorfmuller et al., Real-Time Hand and Head Tracking For Virtual Environments Using Infrared Beacons, Captech'98, XP-002482747, LNAI 1537, 1998, pp. 113-127.

International Search Report, PCT/GB2007/002979, Jun. 12, 2008, 3 pages.

* cited by examiner

DISPLAY SYSTEM FOR VIRTUAL REALITY

This application claims priority to and all the advantages of International Application No. PCT/GB2007/002979, filed on Aug. 6, 2007, which claims priority to Great Britain Patent Application No. 0615433.0, filed on Aug. 4, 2006.

The present invention relates to display systems. Preferred embodiments of the invention may be used in immersive virtual reality simulators.

Conventional large or medium-sized display screens are used for anything from movie cinemas to advertising in shop displays to commercial virtual reality immersion systems for visualisation (e.g. data, automobile design, architecture). Conventionally, display screens are positioned upright, at a 90° angle to the line-of-sight of the viewer, and front or rear-projected. Sometimes the larger display screens, as used in virtual reality (VR), are curved radially around the viewer, for increased immersion in a wide-field visual surround. The screens always have a 'landscape' rather than 'portrait' format, whatever the chosen aspect ratio (e.g. 4:3, 16:9). Historically, even panoramas (first patented in London in 1797) were based on straight upright displays.

There is a tendency to think of virtual reality in terms of head-mounted-displays (HMDs). HMDs have certain advantages in terms of use of space, direct control of left/right eye imagery (e.g. for stereo), and isolation from external visual distractions. However, there has also been a trend in recent years to move from HMDs in VR to larger, projected displays due to numerous factors including greater field size, the reducing costs and improved image quality of (LCD, DLP) projectors, the facility for simultaneous multiple viewers, the relative intrusiveness and visual isolation of HMDs, and the sheer awe of having large scale displays for producing a sense of 'presence'.

Medium-sized display screens are known, with the facility to tilt the screen away from the viewer, between a conventional upright (90°) position and a tilted (45°) position. The purpose of the tilted 45° position is to afford a "birds-eye" view of the screen—that is to say, a view from above. To this end, the lower edge of the screen is disposed well above floor level, to allow the viewer to stand or sit close to the screen and look down onto it, as one might with a drafting table or artist's easel. Images are rear-projected onto the screen.

A recent "conical" display comprises a cylindrical 270° projection display system in which the projection surface is tilted backwards by a small angle of 5° to 12°, which is intended to be unnoticeable to the viewer.

Preferred embodiments of the present invention aim to provide improved methods and systems for displaying images in a more realistic manner—and also in a more interactive manner.

In a first aspect, the present invention provides a method of displaying an image on a screen having upper and lower extremities to a viewer located in front of the screen and at a horizontal distance from the screen, the method comprising the steps of:
 (a) inclining the screen at an angle of 60° or less to a horizontal plane behind the screen;
 (b) arranging the viewer and screen such that the upper extremity of the screen is further away than its lower extremity from the point of view of the viewer with said upper extremity above the head height of the viewer; and,
 (c) displaying the image on the screen.

Preferably, the displayed image comprises a ground, the image of the ground being arranged on the screen such that a portion of the ground which appears closer to the viewer is displayed lower on the screen than a portion which appears further away from the viewer.

Preferably, at least a portion of the ground is planar.

The image can be arranged such that the planar portion is at the bottom edge of the screen and extends towards the viewers feet.

Preferably, the displayed image is an image of a real scene.

Preferably, the method further comprises the step of determining the position of the viewer and displaying an avatar on the screen related to the position of the viewer.

Preferably, the position of the viewer is determined at multiple times and the displayed avatar updated in response to changes in the position of the viewer.

Preferably, the method further comprises the step of changing the displayed image in response to a change of position of the viewer.

The method further comprises the step of displaying a virtual object in addition to the image of the real scene, the virtual object being arranged to move with the real scene when the viewer moves such that the virtual object appears to have a fixed position within the real scene The method further comprises the step of providing a moving walkway, preferably a treadmill and arranging the viewer on the walkway.

Preferably, the method further comprises the step of changing the displayed image in response to motion of the moving walkway.

Preferably, the lower extremity of the screen is at or adjacent floor level.

Said lower extremity may be 0.5 metres or less above floor level.

Said upper edge may be at least 1.8 metres above floor level.

Said upper edge may be at least 2 metres above floor level.

Preferably, said image is displayed on the screen by a front-projection system.

Alternatively, said image may be displayed on the screen by a rear-projection system.

Alternatively, the screen may generate its own image. It may for example be a plasma or LCD screen.

A method as above may include the step of playing sound by means of at least one loudspeaker at or adjacent said upper extremity of the screen and at least one loudspeaker at or adjacent said lower extremity of the screen.

The screen may be at least partially curved in the horizontal direction, to at least partly surround the viewer.

In a method as above, the viewer may be standing. Alternatively, the viewer may be seated.

The invention extends to a method of playing a game, wherein a player interacts with an image displayed on a screen by a method according to any of the preceding aspects of the invention.

The image may be displayed to an audience comprising a plurality of said viewers.

In such a method, the audience may be seated and the width of seating provided for the audience may correspond substantially to the width of the screen.

The width of the seating may correspond approximately to the width of the screen, within ±20%, 10% or 5%.

Preferably, said angle of inclination of the screen is 45° or less.

Preferably, said angle of inclination of the screen is in the range 30° to 45°.

In a further aspect of the invention there is provided an apparatus for displaying an image comprising a screen with upper and lower extremities, the screen being inclined at an angle of 60° or less to a horizontal plane behind the screen;

image capture means adapted to record at least one image of a viewer;

display means adapted to receive an image signal and to display the image signal as an image on the screen; and processing means adapted to receive the at least one image of the viewer from the image capture means and to provide an image signal to the display means, the processing means being adapted to calculate the position of the viewer from the at least one image of the viewer and to provide an image signal comprising a background image and an image for an avatar, the position of the avatar being related to the position of the viewer.

Preferably, the image capture means comprises a plurality of spaced apart cameras adapted to record images of the viewer.

Preferably, the display means comprises a background image display means and an avatar display means.

The processing means can be adapted to change the image of the avatar in response to a change in position of the viewer.

The processing means can be adapted to change the background image in response to a change in position of the viewer.

The background image provided by the processing means can comprise a pre-stored image.

The pre-stored image can comprise a real image.

Preferably, the background image further comprises at least one virtual object generated at the time of provision of the image signal to the display means.

The virtual object can be arranged to have a fixed position relative to objects of the pre-stored image.

An apparatus can further comprise a moveable walkway, preferably a treadmill, the image capture means being arranged to record the image of a viewer on the walkway.

The walkway can be in communication with the processing means, the processing means being adapted to update the background image in response to motion of the walkway.

Such an apparatus for displaying an image may be arranged to perform a method according to any of the preceding aspects of the invention.

For a better understanding of the invention, and to show how embodiments of the same may be carried into effect, reference will now be made, by way of example, to the accompanying diagrammatic drawings, in which.

In the figures, like references denote like or corresponding parts.

Figure 1:
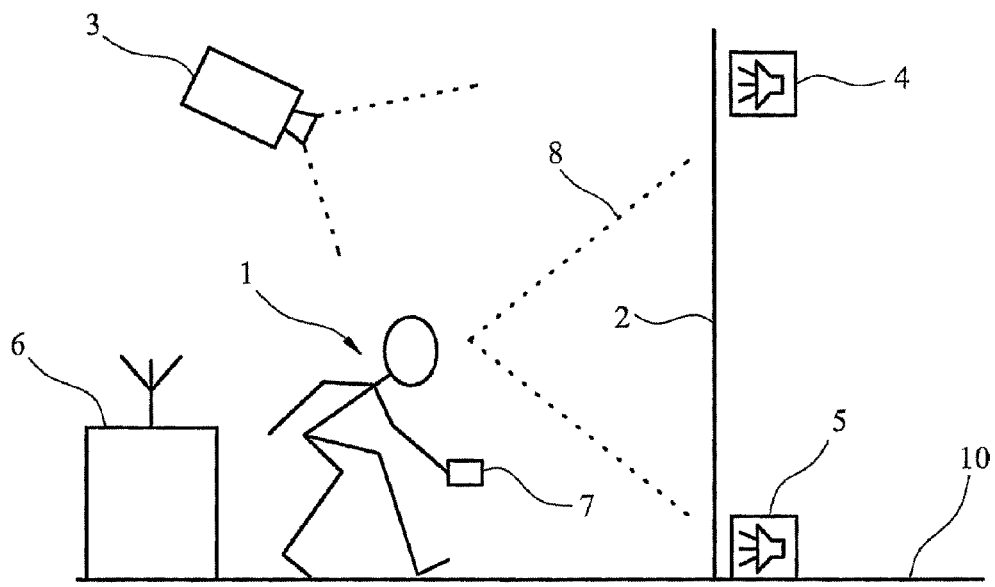
FIG. 1 illustrates a known virtual game apparatus in which a player interacts with an image displayed on a conventional upright screen.

In the apparatus of FIG. 1, a player 1 of a virtual game interacts with an image displayed on a vertically upright screen 2. The image is front-projected onto the screen 2 by a projector 3 under the control of a game controller 6. Loudspeakers 4 and 5 also linked to the game controller 6 are positioned respectively at or adjacent the upper and lower edges of the screen 2, and are located behind the screen 2.

Many types of virtual games are known, and do not require a detailed explanation here. By way of a simple example to assist understanding, the player 2 in FIG. 1 holds or wears an item 7 that is linked to the controller 6 by a wired or wireless connection—in this example, the item 7 is a baseball catcher's glove. Movement of the glove 7 is detected by the controller 6, which operates a scoring scheme in dependence upon the glove movement as related to a moving image displayed on the screen 2.

Figure 2:
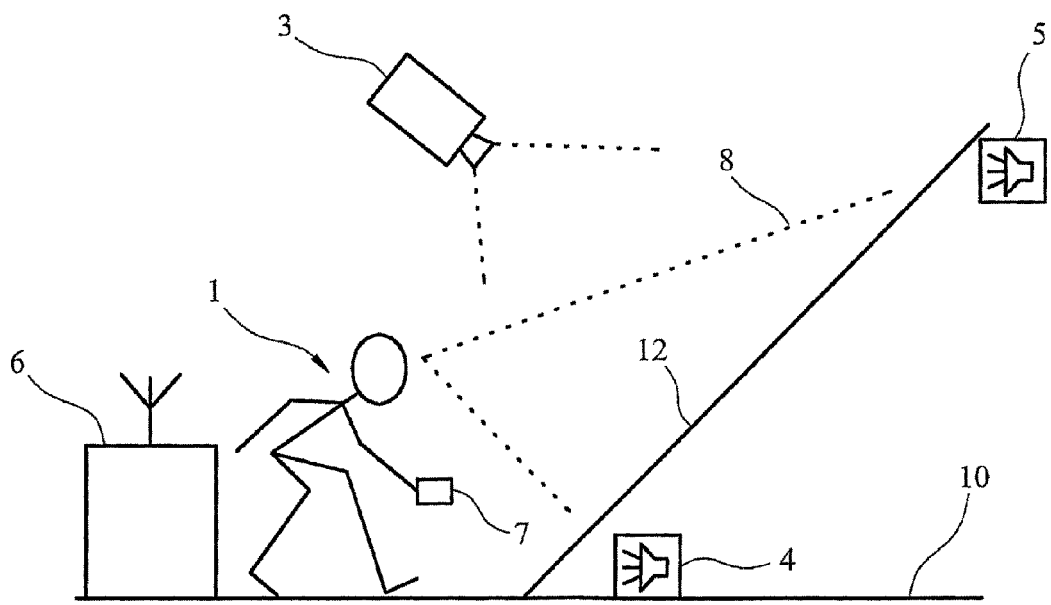
FIG. 2 is a view similar to that of FIG. 1, but showing an apparatus having a slanted screen for illustrating the method according to the invention.

In FIG. 2 the upright screen 2 of FIG. 1 is replaced by a screen 12 that is slanted away from the player at an angle of approximately 45° to the (horizontal) floor 10 behind the screen 12. The significance of this is that, as may be seen by comparing FIGS. 1 and 2, the gaze 8 of the player 1 has a much more realistic relationship with a scene displayed on the screen 12. Further benefits and advantages are discussed in the following.

2-D images derived from or representing natural scenes often contain a direct, monotonic correlation between vertical position (height in pixels) in the image domain and physical distance from the observer in the object domain (depth or distance in meters). This is a consequence of living on a flat surface, looking and moving straight ahead within it. For example, if you stand outside, say in a field, and look forward towards the horizon, objects lower down will usually be closer to you than objects higher up (until the horizon at any rate). Furthermore, the distances as you move your gaze from down to up are increasing, smoothly/monotonically, along a flat terrain. The relationship is generally transferred to 2D when a picture is taken; although we tend not to be aware of this because our interest is typically centred on objects, which are usually upright and situated at fixed distances (e.g. a tree in a field, a group of people), this relationship to distance often holds in many types of images. The presence of objects does not change the overall relationship for distance, which acts as the framework in captured images inherent in the physical nature of the environment.

In the embodiment of FIG. 2, slanting the screen 12 creates in the observer's physical (i.e. room) domain similar image-domain characteristics present in the real scenes. The top of the screen 12 is physically farther away from the observer 1 as are the represented parts of the scene in that image region. Similarly, the bottom of the screen 12 conveys the same relationships with nearby parts of the scene. When the observer 1 looks at different parts of the screen 12 they are experiencing some of the same psychological and sensory effects as they would in real life. Within the viewable range, scanning up/down traverses far/near in both gazing the screen 12 and scanning its contents, and similarly left/right perusal results in little change in both domains. There are cognitive and sensory/perceptual reasons why such an arrangement will work better than conventional upright screens, as described further.

While it is intended to project what an observer 1 may see out into the distance, in actual fact standing in front of a conventional upright VR screen 2 instead is more like looking through a window. You cannot generally reach out or walk through a window to the objects seen outside, and this limits the sense of affordance and sensory expectations generated from the display and its contents. Slanting the screen 12 away from the observer 1 at the top, on the other hand, creates both a real and a psychological space in front of the observer's arms, that is more compatible with reaching, pointing or grasping objects in the displayed scenes. At the same time, bringing the bottom end closer to the observer's feet provides a similar sense of affordance, to more readily be able to 'step into' the environment, or to otherwise use one's legs. This is a cognitive property which is in addition to the relationships between the physical nature of the screen 12 and its contents as explained above.

Fixating an object situated at a given distance in the real world results in the eyes rotating within their sockets (inwards or outwards) such that the central axes of gaze of both eyes converge on that object, and its image thus falls on corresponding central parts of the two retinas. The closer the object the more 'crossed' are the two eyes as they converge to look at it. This allows a 3-dimensional perceptual reconstruction of the scene (via stereopsis, by registering relative retinal disparities) and prevents a double image of the fixated object of interest (although objects in front or behind the planar arc of the object, known as the horopter, are in fact in double vision). At the same time, the eyes each change their accommodation (focus) according to the distance of the fixated object so that its image on the retinas is as sharp as possible. In addition, the relationship between vergence eye movements and accommodation is, in the real world, constant across a large range of distances—the closer objects are, the more crossed are the eyes and the greater the power of accommodation (in dioptres) required, and thus similarly for all object distances presented within the range of accommodation and convergence.

When scenes are presented on conventional upright displays 2, because everything is shown at approximately the same physical distance to the observer 1, the sensory and perceptual parameters described are suddenly in conflict with the scene contents: both near and far objects (as conveyed by their screen images) now require the same level of convergence and accommodation—fixed according to the distance between the screen 2 and the observer 1. Even if stereo viewing is introduced (by variously presenting appropriately different views to each eye) the physical accommodation cues dictated by the screen 2 do not change, and there is then a further conflict between convergence and accommodation. In stereo viewing, the eyes are expected to diverge or converge but the normally accompanying accommodation changes (if they were to take place) would result in blurred images, which again is another disturbing difference to real scene viewing. Apart from breaking realistic relationships, some of these conflicts can also contribute to unpleasant effects, such as simulator sickness, as well as after-effects.

Because the distance relationships between real (screen distance) and imaged (object distance) are in a relative sense preserved in the slanted screen 12 of FIG. 2, the above sensory conflicts do not occur, and so the expected depth rendering of objects would be better. In addition, the resulting unpleasant effects and after-effects may therefore also be reduced or eliminated. Note that, while the precise quantitative distance relationships may not necessarily be reproduced in the slanted display 12, the general relationships would—the underlying peripheral and central brain mechanisms are sufficiently plastic and adaptive to accommodate for quantitative differences better than they are at gross relational changes.

There is no question that sounds combined with moving imagery can dramatically enhance the sense of presence. For optimum effect, the sound should reflect the location from where it originates in such a way that it ties in with the visual imagery. The slanted screen concept may help in creating better localisation of sounds with images by placing speakers behind the screen at different locations. Thus, unlike the conventional upright display 2 of FIG. 1, the upper loudspeaker 4 in FIG. 2 is physically farther away from the listener than the lower loudspeaker 5, in the same way that the images from that region would be, and all else being equal, sounds emanating from the upper loudspeaker 4 would take longer to reach the ears. Thus, not only will the physical geometry of the display automatically help in creating depth in sound, but the correspondence between sound and sight can be more directly applied. Some of the same cognitive and perceptual advantages mentioned for the slanted display 12 will also apply to generated sounds.

In FIG. 2, although only one upper speaker 4 and one lower speaker 5 are shown, each may in practice represent a pair of left and right stereo speakers (or any other spatial array).

A further advantage of the slanted projection screen 12 of FIG. 2 is that it allows a more easily placed, front-projection system 3, compared with more space-consuming rear-projectors but also compared with conventional upright projection displays 2 (where the observer might more readily occlude the projection). This may be seen by comparing FIGS. 1 and 2. In the front-projection arrangement of FIG. 2, the slant of the screen 12 allows moving the projector 3 further up and forward and thus also creates more moving space, and is thus less constrictive, for the observer/user 1 in an interactive application (e.g. a golf driving range game).

Conventionally, VR projection screens are physically at horizontally dominant aspect ratios of 4:3, 16:9 (widescreen) or panoramic curvilinear surround formats. The general argument for wide screens is that it increases immersion and hence presence. However, it may be argued that immersion is not actually a passive process but an active one, and greater exposure to the stimulus in the direction in which action or interest takes place (rather than necessarily sideways) will enhance immersion. An optional arrangement, therefore, is to adopt an aspect ratio to one that is vertically dominant, such as 'portrait', thus giving a higher range of distances, in the direction of action or interest of the observer, with which to render the scene. This would be an application dependent choice, but it is worth considering the notion that most action one takes (walking, throwing, shooting) is directed not to one's sides but up ahead, and where side-directed action is required, one typically rotates to face it.

Because the lower edge of the screen 12 is at or adjacent floor level 10, it is impractical for the player 1 to approach the screen 12 very closely and, in particular, to reach over the screen 12 to look down on it. That is, the player 12 will naturally occupy a position spaced from the screen 12, thereby preserving the various benefits of the slant of the screen 12.

The method according to the present invention may be useful for the creation of immersive simulations of the real-world represented in virtual reality environments. It may be especially useful for interaction-oriented immersions, through being particularly effective at reproducing depth relationships between the user and objects in the observed environment: depth relationships are crucial for correct perceptual engagement with the visual environment. The method according to the present invention may be used by a static observer. Alternatively the method may employ interface devices, such as a treadmill-type walking interface for running, or other appropriate interfaces for driving, shooting, playing tennis, playing golf and the like. Such methods according to the invention are discussed in further detail with reference to FIG. 3.

The concept of preferred embodiments of the invention is particularly applicable to viewing static or dynamic natural scenes, that is, images that represent physical environments (whether real or imaginary), as it exploits the physical properties that the natural environment imposes on visual images, and the sensory and cognitive consequences of looking at them. The method of displaying an image on such a screen is particularly 'immersive' when the viewer is arranged such that the upper extremity of the screen is above the head height of the viewer.

In addition, some types of image are more 'immersive' than others. In particular, displayed images which include a ground preferably a flat ground, are to be preferred. As previously discussed, the image is arranged such that the ground further away from the viewer appears higher up on the screen than ground closer to the viewer, so reducing sensory conflict. The reduction in sensory conflict is particularly apparent when the ground in the image extends towards the viewers feet.

Thus, advantages of the method according to the invention include the following:

mimics the physical properties of real scenes & localized sounds;

more immersive, better depth perception than upright displays;

reduced sensory & cognitive conflicts;

simpler (front) projection, few distortions (as compared to rear projection, front projection creates less foreshortening on the inclined screen as it is viewed by the user, thus requiring no computer-based or other corrections for geometric distortions that rear-projection would create); and increased forward working space (reduced claustrophobia);

The slanted display screen concept as illustrated is useful, in principle, for applications that attempt to produce and present visually compelling naturalistic environments (both real and synthetic) that benefit from immersive medium or large-scale displays. Potential applications include the so-called 'edutainment' categories, such as games and training & testing simulators (which may overlap).

The following are examples of existing applications which might make use of the method of the invention:

commercial golf simulators;
walking or running simulators;
racing car simulators;
commercial aviation and military flight cock-pit simulators;
military applications in training and testing soldier performance during active warfare simulations, sharp-shooting or artillery firing (including tank driving simulators);
automobile driving simulators (e.g. for HGVs, motorbikes, cars);
train driving simulators;
sports and athletic training simulators including racket sports (e.g. tennis), batting sports (e.g. cricket, baseball);
architectural walk-through simulators;
fire-fighting and escape simulators;
generic, high-end VR simulators;
immersive cinema applications, as in iMax or OmniMax.

In a variation, an image is displayed on an inclined screen 12 to an audience, and the audience can be either seated or standing. In both cases, the lower edge of the screen 12 need be only at height that is the lowest average height that is viewable by the audience. The upper edge, as before, is above the average head height of the audience. Where the audience is seated, the width of the seating may correspond substantially to the width of the screen. The width of the seating may correspond approximately to the width of the screen, within ±20%, 10% or 5%. In a variation, the screen may be at least partially curved in the horizontal direction, to at least partly surround the audience. The screen may therefore form a partial or complete "bowl" around the audience. The incline of the screen may be a curve rather than linear.

In a variation, the "audience" can be an individual in a single seat that is narrower than the screen width.

In preferred methods of the invention, the screen 12 is inclined at an angle of 45° or less to a horizontal plane behind the screen. This is in order to activate the physiological, perceptual and cognitive processes, etc. of the viewer. Depending upon physical constraints, it may be possible to increase this angle somewhat to, say, 60°, but our view is that an angle of 45° or less will give the most effective results, with greater effects at lower angles. However, the angle of inclination of the screen 12 is preferably such that the viewer, when looking straight ahead, can still see at least the top of the screen 12.

In the above examples 12, the screen typically extends above the average head height of the viewer. The average height of an adult male in the United States is approximately 1.75 metres and that of a female is approximately 1.61 metres, giving a male/female average of about 1.68 metres.

In the above examples, the lower edge of the screen 12 is typically at or adjacent floor level. For practical reasons, the lower edge of the screen 12 may have to be spaced slightly from the floor—a distance of up to 0.5 metres might be acceptable, whilst still preserving the desired characteristics of the system.

Figure 3:
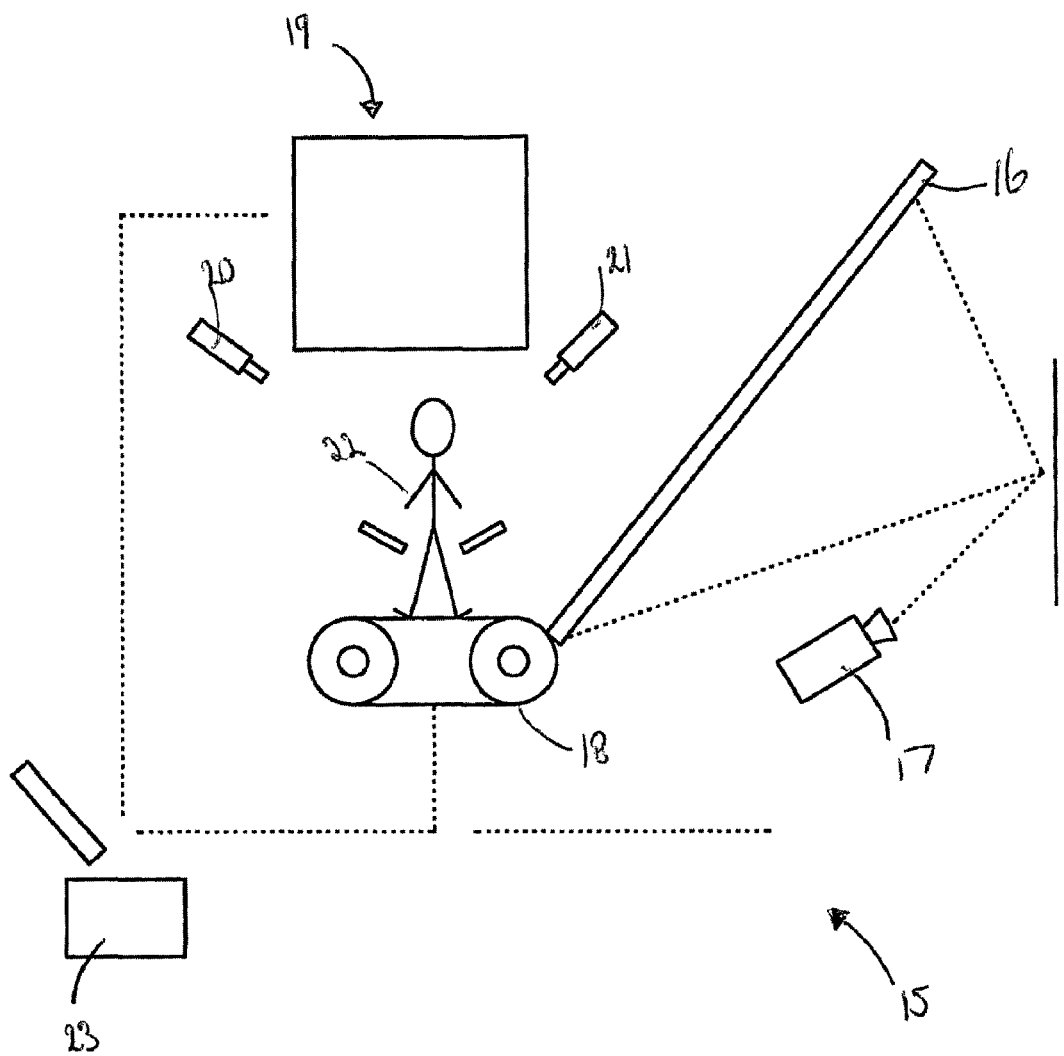
FIG. 3 shows an apparatus according to the invention in schematic view.

Shown in FIG. 3 is an embodiment of an apparatus 15 for displaying an image according to the invention. The apparatus 15 is particularly suitable for employing the methods according to the invention previously discussed. The apparatus 15 comprises an inclined screen 16 inclined at an angle of less than 60° to the horizontal. The advantages of such a screen 16 have been described in detail with reference to FIGS. 1 and 2. The image is displayed on the screen 16 by a display means 17 comprising a rear projector.

The apparatus 15 further comprises a moveable walkway 18 which in this embodiment is a treadmill. The treadmill 18 is arranged in front of the screen 16 with the screen 16 extending down to almost touch the treadmill 18 as shown.

The apparatus 15 further comprises image capture means 19 comprising first and second spaced apart cameras 20,21. The cameras 20,21 are arranged to record a stereo image of a viewer 22 arranged on the treadmill 18 in front of the screen 16. In other embodiments more than two cameras are possible. The apparatus 15 could for example comprise four cameras or twenty cameras.

The images captured by the image capture means 19 are passed to a processing means 23. The processing means 23 determines the position of the viewer 22 from the captured images and provides an image signal to the display means which displays the signal as an image on the screen 16.

The image signal produced by the processing means 23 comprises a background image. The background image is typically a pre-stored image of a real scene (as opposed to an artificial image generated by computer). The image is typically chosen to include a ground or floor level. The further a portion of the floor is from the viewer 22 the higher up it is displayed on the screen 16. Typically the displayed floor is displayed to be contiguous with the treadmill 18. A portion of the floor close to the bottom edge of the screen 16 is planar and extends towards the viewers feet.

The image signal produced by the processing means 19 also includes the image of a avatar related to the determined position of the viewer 22. The position of the viewer 22 could simply be the position of the torso of the viewer 22. In a more sophisticated embodiment the processing means 19 determines the position of one or more of the limbs or head of the viewer 22 and the displayed image of the avatar reflects the position of the head and/or limbs. In alternative embodiments the apparatus 15 displays only a portion of the avatar, for example the hands or feet. In an alternative embodiment only the top half of the avatar is responsive to the viewers movements. The avatar could be a stick figure or alternatively a more realistic representation of the viewer.

The image capture means 19 captures the position of the viewer 22 at intervals. As the position of the viewer 22 changes the displayed image of the avatar changes on the screen 16.

The treadmill 18 is also connected to the processing means 23. As the viewer 22 walks on the treadmill 18 the distance travelled is passed to the processing means 23 which updates the background image such that the avatar appears to have moved forward (or backward) by a distance proportional to the distance the viewer 22 has travelled on the treadmill 18.

In an alternative embodiment the background remains stationary and as the viewer 22 walks forward the avatar moves into the image on the screen 16.

In the present embodiment the display means 17 comprises a single projector 17. In an alternative embodiment the display means 17 comprises separate projectors for the avatar image and background image respectively. In an alternative embodiment of the invention the screen 16 is able to display its own image, for example an LCD screen or plasma screen.

In a further embodiment of the invention the processing means 23 adds an image of a virtual object to the pre-stored background image at the time of generation of the image signal. Typically the virtual object is arranged so as to remain in the same fixed relation relative to elements of the background image. If the background image is altered it is necessary to re-draw the virtual object allowing for any translated displacements and also any changes in perspective as the avatar moves into or out of the background image. Typically such virtual objects act as obstacles which the viewer must guide the avatar over or around. At least one virtual object can be a further avatar. The behaviour of the further avatar could be pre-recorded or may respond to the actions of the viewers avatar.

Alternative types of interface to a treadmill 18 are possible. For example the interface could be the controls of a car with the background image being updated according to the position of the steering wheel and position of the car.

In the above embodiments the background image and image of the avatar are essentially de-coupled. The image of the avatar is determined by the motion capture system and the background image is determined by the interface, such as the treadmill 18. In an alternative embodiment both the background image and avatar image are updated in response to the motion of the viewer 22. For example if the viewer 22 jumps the background image moves up and down or if the viewer 22 turns the background image may turn. In such embodiments an interface may not be necessary.

Caption for FIG. 1—Conventional Screen
  Like looking through a window
  Limited projection and interaction space in front
  Equal gaze distances for different scene distances
  Eye vergence and focus conflicts (simulator sickness)
  Sound localisation harder to create (near/far)
Caption for FIG. 2—Slanted Screen
  Can 'step into' scene (greater affordance)
  Larger interaction space in front
  Gaze distances proportional to scene distances
  Natural eye vergences and focus relationships (and better stereo)
  Sound localisation better and easier projection placement

The invention claimed is:

1. A method of displaying an image on a screen having upper and lower extremities to a viewer located in front of the screen and at a horizontal distance from the screen, the method comprising the steps of:
   (a) inclining the screen at an angle of 60° or less to a horizontal plane behind the screen;
   (b) arranging the viewer and screen such that the upper extremity of the screen is further away than its lower extremity from the point of view of the viewer with said upper extremity above the head height of the viewer; and,
   (c) displaying the image on the screen, wherein the displayed image comprises a ground, the image of the ground being arranged on the screen such that a portion of the ground which appears closer to the viewer is displayed lower on the screen than a portion which appears further away from the viewer.

2. A method as claimed in claim 1 wherein at least a portion of the ground is planar.

3. A method as claimed in claim 2 wherein the image is arranged such that the planar portion is at the lower extremity of the screen and extends towards the of the viewer.

4. A method as claimed in claim 1, wherein the displayed image is a real scene.

5. A method as claimed in claim 1, further comprising the step of providing a moving walkway and arranging the viewer on the walkway.

6. A method as claimed in claim 5, further comprising the step of changing the displayed image in response to motion of the moving walkway.

7. An apparatus for displaying an image comprising
   a screen with upper and lower extremities, the screen being inclined at an angle of 60° or less to a horizontal plane behind the screen;
   image capture means adapted to record at least one image of a viewer;
   display means adapted to receive an image signal and to display the image signal as an image on the screen; and
   processing means adapted to receive the at least one image of the viewer from the image capture means and to provide an image signal to the display means,
   the processing means being adapted to calculate the position of the viewer from the at least one image of the viewer and to provide an image signal comprising a background image and an image for an avatar, the position of the avatar being related to the position of the viewer.

8. An apparatus as claimed in claim 7, wherein the image capture means comprises a plurality of spaced apart cameras adapted to record images of the viewer.

9. An apparatus as claimed in claim 7, wherein the display means comprises a background image display means and an avatar display means.

10. An apparatus as claimed in claim 7, wherein the processing means is adapted to change the image of the avatar in response to a change in position of the viewer.

11. An apparatus as claimed in claim 7, wherein the processing means is adapted to change the background image in response to a change in position of the viewer.

12. An apparatus as claimed in claim 7, wherein the background image provided by the processing means comprises a pre-stored image.

13. An apparatus as claimed in claim 12, wherein the pre-stored image comprises a real scene.

14. An apparatus as claimed in claim 12, wherein the background image further comprises at least one virtual object generated at the time of provision of the image signal to the display means.

15. An apparatus as claimed in claim 14, wherein the virtual object is arranged to have a fixed position relative to objects of the pre-stored image.

16. An apparatus as claimed in claim 7 further comprising a moveable walkway, the image capture means being arranged to record the image of a viewer on the walkway.

17. An apparatus as claimed in claim 16, wherein the walkway is in communication with the processing means, the processing means being adapted to update the background image in response to motion of the walkway.

18. A method of displaying an image on a screen having upper and lower extremities to a viewer located in front of the screen and at a horizontal distance from the screen, the method comprising the steps of:
(a) inclining the screen at an angle of 60° or less to a horizontal plane behind the screen;
(b) arranging the viewer and screen such that the upper extremity of the screen is further away than its lower extremity from the point of view of the viewer with said upper extremity above the head height of the viewer;
(c) displaying the image on the screen; and
(d) determining the position of the viewer and displaying an avatar on the screen related to the position of the viewer, wherein the position of the viewer is determined at multiple times and the displayed avatar updated in response to changes in the position of the viewer.

19. A method as claimed in claim 18, further comprising the step of changing the displayed image in response to a change of position of the viewer.

20. A method as claimed in claim 19 wherein the displayed image is a real scene and further comprising the step of displaying a virtual object in addition to the image of the real scene, the virtual object being arranged to move with the real scene when the viewer moves such that the virtual object appears to have a fixed position within the real scene.

* * * * *

UNITED STATES PATENT AND TRADEMARK OFFICE
CERTIFICATE OF CORRECTION

PATENT NO. : 8,414,130 B2
APPLICATION NO. : 12/376300
DATED : April 9, 2013
INVENTOR(S) : Adar Pelah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this
Twenty-eighth Day of May, 2013

Teresa Stanek Rea
*Acting Director of the United States Patent and Trademark Office*